UNITED STATES PATENT OFFICE.

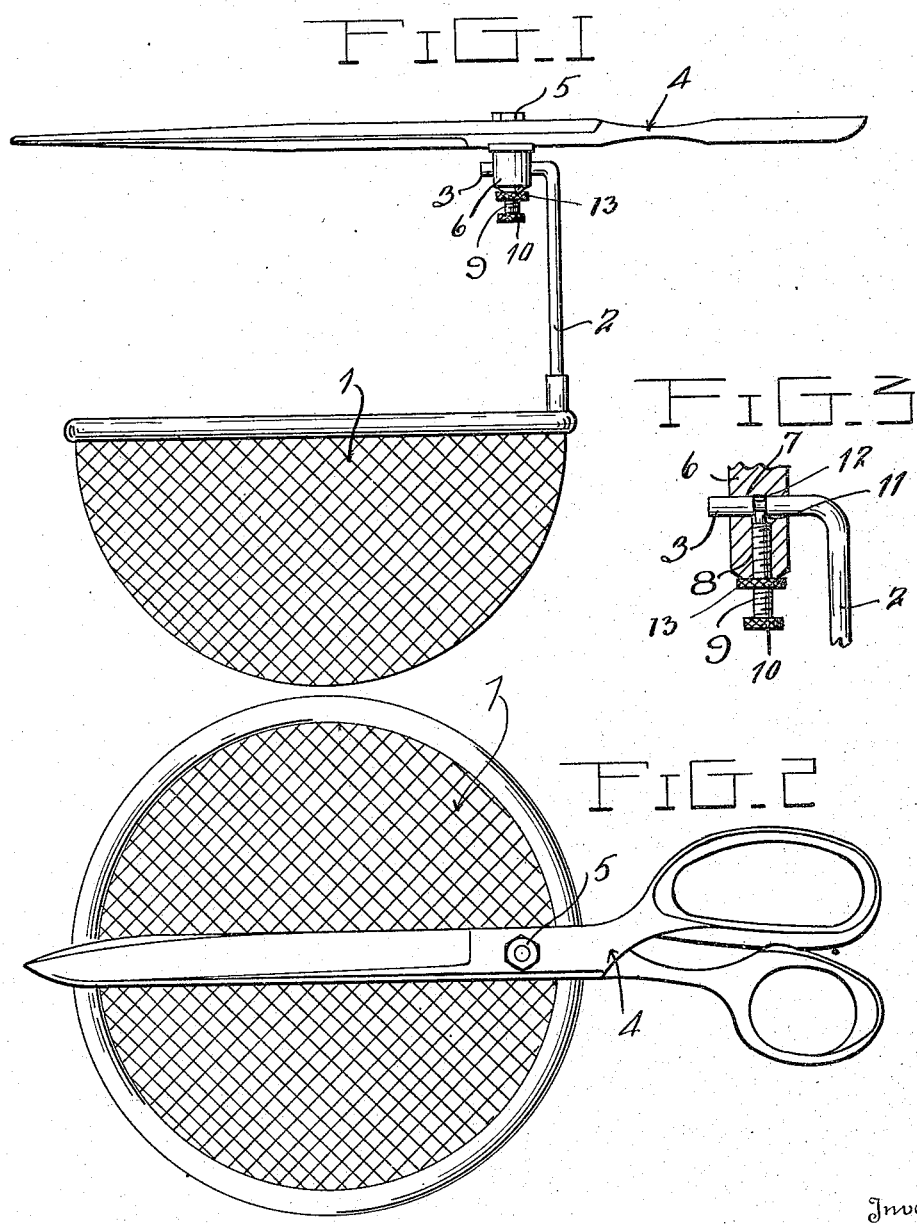

GEORGE E. DARR, OF ONTARIO, OREGON.

FRUIT-PICKER.

1,171,324. Specification of Letters Patent. Patented Feb. 8, 1916.

Application filed October 29, 1914. Serial No. 869,256.

*To all whom it may concern:*

Be it known that I, GEORGE E. DARR, a citizen of the United States, residing at Ontario, in the county of Malheur and State of Oregon, have invented certain new and useful Improvements in Fruit-Pickers; and I do hereby declare the following to be a full, clear, and exact description of the invention, such as will enable others skilled in the art to which it appertains to make and use the same.

My invention relates to improvements in devices for picking or gathering fruit, particularly small fruit, such as cherries, plums and the like and of the type wherein a receptacle is operatively connected with means for cutting the fruit.

An object of importance is to provide a fruit picking device of the character described that comprises a receptacle which is pivotally suspended from shears and arranged so that it may be readily detached from the shears and attached thereto.

Another object is to generally improve and simplify devices of the above mentioned character so as to render them more practical, reliable and efficient in operation and inexpensive to manufacture.

The above and additional objects are accomplished by such means as are illustrated in the accompanying drawings, described in the following specification and then more particularly pointed out in the claim.

With reference to the drawings, wherein I have illustrated the preferred embodiment of my invention as it is reduced to practice, and throughout the several views of which similar reference numerals designate corresponding parts, Figure 1 is a side elevation of my improved fruit picker, Fig. 2 is a top plan view, and Fig. 3 is an enlarged detail sectional view showing the means for detachably and pivotally connecting the receptacle with the cutting means.

Referring to the drawings by characters of reference, the numeral 1 designates as an entirety a receptacle that is preferably of wire cloth or some other similar foraminous material and formed into a semi-spherical shape with its open side disposed uppermost. Carried by the receptacle 1 on one side thereof is an upstanding arm 2 that is provided with a right angular extension 3 at its upper end.

Arranged to be mounted upon the arm 2 is a pair of shears designated 4 as an entirety. Pivotally carried by the shears at the pivot point 5 thereof and depending therefrom is a cylindrical attaching member 6 that is provided with a transverse opening 7 extending through from one side to the other intermediate its ends. The extension 3 is designed to extend through the opening 7 and be loose within the attaching member. A vertical opening 8 is formed in the lower end of the attaching member 6 and communicates with a transverse opening 7. A set screw 9 having a knurled head 10 is turned within the opening 8, said opening being screw threaded. The set screw is provided with a reduced inner end 11 which is designed to engage within the circumferential groove 12 formed in the extension 3 in order to prevent said member 6 from slipping from the extension 3. Also it will be observed that should it be desired to hold the shears in one position relative to the receptacle 1 for any length of time all that need be done is to tighten the set screw 9 so that the member 6 is prevented rotation relative to the member 3. A jam nut 13 is threaded on the shank of the set screw 9, and adjustable against the lower end of the attaching member 6, so as to hold the set screw 9 against accidental rotation. As the blades of the shears are disposed immediately above the mouth of the receptacle 1 such fruit as cherries, plums and the like may be cut in large numbers in an expeditious manner and will drop into the receptacle for containing them. The member 6 and coöperating arm 2 permits free movement of the cutting means relative to the receptacle.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

A fruit picker comprising, a receptacle, an upstanding arm carried by the receptacle and having its upper end projecting above the receptacle and provided with a right angular projection thereon, the said projection having an annular groove therein, cutting members located at the upper end of the arm and having a cylindrical shaped body depending therefrom, said cylindrical shaped body having a transversely extending opening therein adapted to loosely receive the angular projection on the arm, and having a longitudinal opening therein communicating with the transverse opening and in alinement with the annular groove in the projection, and a set screw threadedly received by the longitudinal opening and having a reduced inner end received by the annular groove in the angular projection on the upstanding arm.

In testimony whereof I affix my signature in presence of two witnesses.

GEORGE E. DARR.

Witnesses:
G. W. LELLS,
LUELLA LONG.

Copies of this patent may be obtained for five cents each, by addressing the "Commissioner of Patents, Washington, D. C."